United States Patent
Kang et al.

(10) Patent No.: US 11,981,973 B2
(45) Date of Patent: May 14, 2024

(54) ZINC PLATED STEEL SHEET HAVING EXCELLENT FATIGUE STRENGTH OF ELECTRICAL RESISTANCE SPOT WELDS, AND MANUFACTURING METHOD THEREOF

(71) Applicant: POSCO, Pohang-si (KR)

(72) Inventors: Ki-Cheol Kang, Gwangyang-si (KR); Chung-Hwan Lee, Gwangyang-si (KR)

(73) Assignee: POSCO, Pohang-si (KR)

(*) Notice: Subject to any disclaimer, the term of this patent is extended or adjusted under 35 U.S.C. 154(b) by 0 days.

(21) Appl. No.: 17/779,923

(22) PCT Filed: Dec. 3, 2020

(86) PCT No.: PCT/KR2020/017532
§ 371 (c)(1),
(2) Date: May 25, 2022

(87) PCT Pub. No.: WO2021/112581
PCT Pub. Date: Jun. 10, 2021

(65) Prior Publication Data
US 2023/0002845 A1    Jan. 5, 2023

(30) Foreign Application Priority Data

Dec. 3, 2019 (KR) .................. 10-2019-0158895

(51) Int. Cl.
*B32B 15/01* (2006.01)
*C21D 6/00* (2006.01)
(Continued)

(52) U.S. Cl.
CPC .............. *C21D 9/46* (2013.01); *B32B 15/013* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS

2013/0327452 A1   12/2013  Fushiwaki et al.
2014/0234658 A1    8/2014  Nozaki et al.
(Continued)

FOREIGN PATENT DOCUMENTS

CN    103154297 A    6/2013
CN    108431273 A    8/2018
(Continued)

OTHER PUBLICATIONS

Chinese Office Action dated Mar. 1, 2023 issued in Chinese Patent Application No. 202080084263.9.
(Continued)

*Primary Examiner* — Daniel J. Schleis
(74) *Attorney, Agent, or Firm* — Morgan, Lewis & Bockius LLP

(57) ABSTRACT

The present disclosure relates to a zinc plated steel sheet having excellent fatigue strength of electrical resistance spot welds and a method for manufacturing the same. According to an aspect of the present disclosure, a zinc plated steel sheet includes a base steel sheet and a zinc-based plating layer formed on a surface of the base steel sheet, wherein a concentration profile of one or two of oxygen, and silicon and manganese measured in a depth direction from the surface of the base steel sheet has a maximum point in the depth direction from the surface, and an absolute value of a difference between a depth at which the maximum point of the concentration profile of oxygen is formed and a depth at which the maximum point of the concentration profile of one of silicon and manganese is formed is 0.5 µm or less.

7 Claims, 1 Drawing Sheet

(51) Int. Cl.
   *C21D 8/02*    (2006.01)
   *C21D 9/46*    (2006.01)
   *C22C 38/00*   (2006.01)
   *C22C 38/02*   (2006.01)
   *C22C 38/06*   (2006.01)
   *C22C 38/22*   (2006.01)
   *C22C 38/26*   (2006.01)
   *C22C 38/28*   (2006.01)
   *C22C 38/32*   (2006.01)
   *C22C 38/38*   (2006.01)
   *C23C 2/02*    (2006.01)
   *C23C 2/06*    (2006.01)
   *C23C 2/28*    (2006.01)
   *C23C 2/40*    (2006.01)

(52) U.S. Cl.
   CPC ............ *C21D 6/008* (2013.01); *C21D 8/0205* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/008* (2013.01); *C22C 38/02* (2013.01); *C22C 38/06* (2013.01); *C22C 38/22* (2013.01); *C22C 38/26* (2013.01); *C22C 38/28* (2013.01); *C22C 38/32* (2013.01); *C22C 38/38* (2013.01); *C23C 2/02* (2013.01); *C23C 2/022* (2022.08); *C23C 2/024* (2022.08); *C23C 2/06* (2013.01); *C23C 2/28* (2013.01); *C23C 2/40* (2013.01); *B32B 2307/718* (2013.01)

(56) References Cited

U.S. PATENT DOCUMENTS

| | | | |
|---|---|---|---|
| 2016/0067947 A1 | 3/2016 | Minowa et al. | |
| 2017/0369974 A1* | 12/2017 | Kim .................... | C21D 9/48 |
| 2018/0105908 A1 | 4/2018 | Hayashi et al. | |
| 2018/0298462 A1 | 10/2018 | Sano et al. | |
| 2018/0371570 A1 | 12/2018 | Kim et al. | |
| 2020/0190652 A1 | 6/2020 | Takeda et al. | |
| 2020/0325568 A1 | 10/2020 | Jin et al. | |
| 2020/0332379 A1 | 10/2020 | Friedel et al. | |

FOREIGN PATENT DOCUMENTS

| | | | |
|---|---|---|---|
| EP | 0900857 A1 | | 10/1999 |
| EP | 3392363 A1 | | 10/2018 |
| EP | 3901319 A2 | | 10/2021 |
| JP | 61-279311 A | | 12/1986 |
| JP | 62-63687 A | | 3/1987 |
| JP | H09-296261 A | | 11/1997 |
| JP | 2004-149866 A | | 5/2004 |
| JP | 2007-211279 A | | 8/2007 |
| JP | 2013-167020 A | | 8/2013 |
| JP | 2014-9399 A | | 1/2014 |
| JP | 2014-122379 A | | 7/2014 |
| JP | 2018-188717 A | | 11/2018 |
| JP | 2019-521257 A | | 7/2019 |
| JP | 2019-532172 A | | 11/2019 |
| KR | 10-1998-702926 A | | 9/1998 |
| KR | 10-2005-0042298 A | | 5/2005 |
| KR | 10-2009-0118290 A | | 11/2009 |
| KR | 10-2015-0131386 A | | 11/2015 |
| KR | 10-1630976 B1 | | 6/2016 |
| KR | 10-2019-0073200 A | | 6/2019 |
| KR | 20190073200 A | * | 6/2019 |
| WO | 2013/047836 A1 | | 4/2013 |
| WO | 2016/171237 A1 | | 10/2016 |
| WO | 2016/199922 A1 | | 12/2016 |
| WO | 2018/117724 A1 | | 6/2018 |

OTHER PUBLICATIONS

Extended European Search Report dated Nov. 22, 2022 issued in European Patent Application No. 20896331.4.
"Standard Practice for Using Significant Digits in Test Data to Determine Conformance with Specifications," American National Standard (Jan. 1, 2013)(URL: http://www.galvanizeit.com/uploads/ASTM-E-29-yr-13.pdf).
International Search Report dated Mar. 24, 2021 issued in International Patent Application No. PCT/KR2020/017532 (with English translation).
Office Action dated Aug. 29, 2023 for counterpart Japanese Patent Application No. 2022-532726.

* cited by examiner

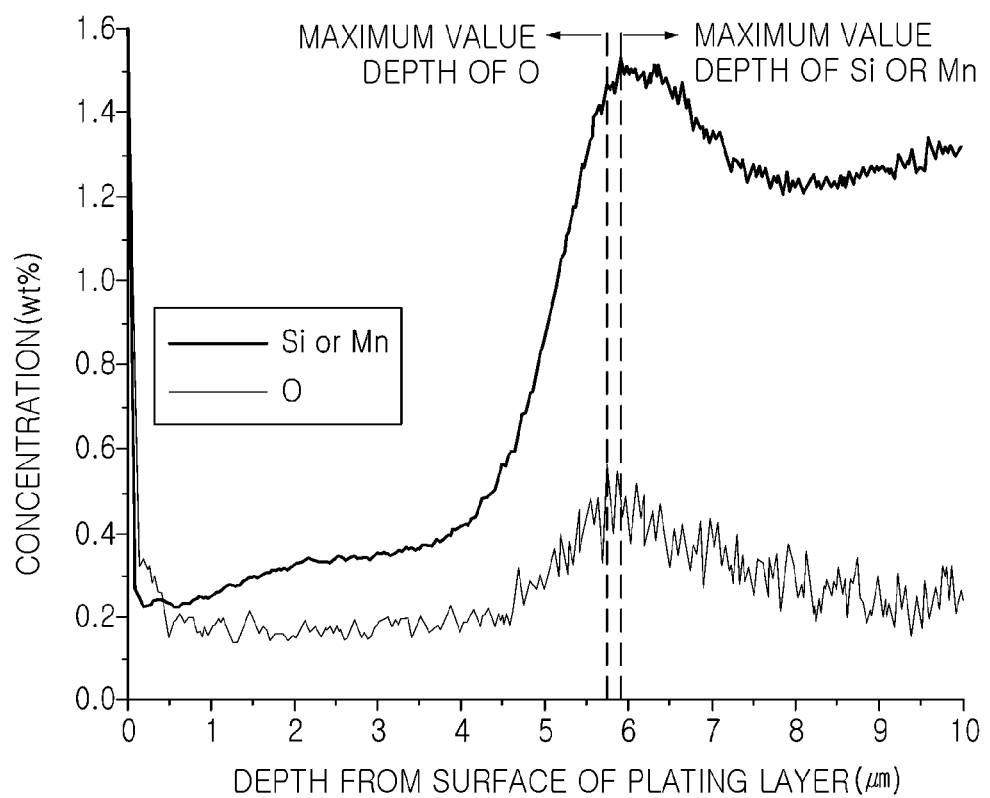

ZINC PLATED STEEL SHEET HAVING EXCELLENT FATIGUE STRENGTH OF ELECTRICAL RESISTANCE SPOT WELDS, AND MANUFACTURING METHOD THEREOF

TECHNICAL FIELD

The present disclosure relates to a zinc plated steel sheet having excellent fatigue strength in electrical resistance spot welds and a method for manufacturing the same.

CROSS-REFERENCE OF RELATED APPLICATIONS

This application is the U.S. National Phase under 35 U.S.C. § 371 of International Patent Application No. PCT/KR2020/017532, filed on Dec. 3, 2020, which in turn claims the benefit of Korean Application No. 10-2019-0158895, filed on Dec. 3, 2019, the entire disclosures of which applications are incorporated by reference herein.

BACKGROUND ART

Regulations on vehicle emissions and fuel economy have been strengthened due to problems such as environmental pollution. Accordingly, there has been strong demand for reduction of fuel consumption by reducing a weight of a steel sheet for a vehicle. Therefore, various types of high-strength steel sheets having high strength per unit thickness have been developed and released.

High-strength steel generally refers to steel having a strength of 490 MPa or more, but is not necessarily limited thereto. High-strength steel may include transformation induced plasticity (TRIP) steel, twin induced plasticity (TWIP) steel, dual phase (DP) steel, complex phase (CP) steel, and the like.

Meanwhile, steel materials for a vehicle are supplied in the form of a plated steel sheet having a surface subjected to plating to ensure corrosion resistance, and thereamong, a galvanized steel sheet (GI steel sheet) or a galvannealed steel sheet (GA) is often used as a material for a vehicle because such steel sheets have high corrosion resistance using sacrificial protection properties of zinc.

However, in a case in which a surface of the high-strength steel sheet is plated with zinc, spot weldability is deteriorated, which is problematic. That is, in the case of the high-strength steel, since yield strength is high as well as tensile strength, it is difficult to remove tensile stress generated during welding through plastic deformation, such that it is highly likely that microcracking will be generated in the surface. When welding is performed on a high-strength galvanized steel sheet, zinc having a low melting point may permeate into the microcracking of the steel sheet. As a result, a phenomenon known as liquid metal embrittlement (LME) may occur, such that the steel sheet may fracture and fatigue strength may be reduced, which is a major obstacle to increasing strength of the steel sheet.

DISCLOSURE

Technical Problem

According to an aspect of the present disclosure, there are provided a zinc plated steel sheet having excellent fatigue strength of electrical resistance spot welds and a method for manufacturing the same.

An object of the present disclosure is not limited to the above description. Those skilled in the art to which the present disclosure pertains will have no difficulties in understanding additional objects of the present disclosure from the overall description in the specification of the present disclosure.

Technical Solution

According to an aspect of the present disclosure, a zinc plated steel sheet includes: a base steel sheet; and a zinc-based plating layer formed on a surface of the base steel sheet, wherein a concentration profile of one or two of oxygen, and silicon and manganese measured in a depth direction from the surface of the base steel sheet has a maximum point in the depth direction from the surface, and an absolute value of a difference between a depth at which the maximum point of the concentration profile of oxygen is formed and a depth at which the maximum point of the concentration profile of one of silicon and manganese is formed is 0.5 µm or less.

According to another aspect of the present disclosure, a method for manufacturing a zinc plated steel sheet includes: heating a steel slab to a temperature of 950 to 1,350° C.; hot-rolling the steel slab to obtain a steel sheet; coiling the steel sheet at a temperature of 590 to 750° C. to obtain a hot-rolled steel sheet; pickling the hot-rolled steel sheet at a sheet-passing speed of 180 to 250 mpm; cold-rolling the hot-rolled steel sheet at a reduction rate of 35 to 60% to obtain a cold-rolled steel sheet; performing recrystallization annealing on the cold-rolled steel sheet in an atmosphere of a dew point of −10 to 30° C. at 650 to 900° C.; and hot-dip galvanizing the annealed cold-rolled steel sheet.

Advantageous Effects

As set forth above, the present disclosure may implement the softening of the surface of the base steel sheet, that is, the base steel sheet in the vicinity of the interface between the plating layer and the base steel sheet by appropriately controlling the concentration profiles of O, Si, and Mn generated inside the base steel sheet constituting the plating layer. A soft layer is formed on the surface, such that tensile stress generated during spot welding is removed through plastic deformation of the soft layer, resulting in a decrease in number and length of cracks. As a result, a high-strength zinc plated steel sheet having excellent fatigue strength of spot welds may be manufactured.

DESCRIPTION OF DRAWINGS

FIG. 1 is a graph illustrating GDOES profiles of oxygen (O) and silicon (Si) or manganese (Mn) for measuring a difference in maximum point depth according to an exemplary embodiment in the present disclosure.

BEST MODE FOR INVENTION

Hereinafter, the present disclosure will be described in detail with reference to several exemplary embodiments.

It should be noted that the term "zinc plated steel sheet" in the present disclosure is the concept including a galvanized steel sheet (GI steel sheet), a galvannealed steel sheet (GA), and a plated steel sheet in which a zinc-based plating layer mainly containing zinc is formed. The notion of "mainly containing zinc" means that a ratio of zinc is the highest among elements contained in the plating layer.

However, in the galvannealed steel sheet, a ratio of iron may be higher than that of zinc, and even a steel sheet having the highest ratio of zinc among the remaining components other than iron may be included in the scope of the present disclosure.

The inventors of the present disclosure have focused on the fact that liquid metal embrittlement (LME) occurring during welding is the cause of microcracking generated from a surface of a steel sheet and may lead to fatigue fracture, have conducted studies on means for suppressing generation of microcracking in the surface, and then have found that it is required to soften the surface of the steel sheet to this end, thereby completing the present disclosure.

In general, high-strength steel may contain a large amount of elements such as carbon (C), manganese (Mn), and silicon (Si) to secure hardenability, austenite stability, and the like of the steel, and these elements serve to increase sensitivity to cracks of the steel. Therefore, microcracking is easily generated in the steel containing a large amount of these elements, which ultimately causes liquid metal embrittlement during welding.

According to the results of studies conducted by the present inventors, in a case in which a relationship between a concentration profile of oxygen (O) and a concentration profile of silicon (Si) and/or manganese (Mn) is appropriately controlled, O and Si and/or Mn being generated in a depth direction from a surface of a base steel sheet, resistance of spot welds to LME may be increased, and thus, fatigue strength of the spot welds may be increased.

That is, as illustrated in FIG. 1, a difference between a depth at which a maximum point appears in the concentration profile of oxygen (O) (refers to a depth from the surface of the base steel sheet) and a depth at which a maximum point appears in the concentration profile of silicon (Si) and/or manganese (Mn) is required to be controlled within 0.5 μm.

As such, a case in which the depths at which the maximum points of the concentration profiles of oxygen and silicon and/or manganese appear are equalized means that the silicon and/or manganese are/is fixed at a predetermined depth inside the base steel sheet in the form of an oxide, which may reduce the concentration of silicon and/or manganese on the surface.

In general, in an annealing process, the silicon and/or manganese diffuse/diffuses to the surface to form an oxide on the surface, and activity of the silicon and/or manganese on the surface is also increased. As such, an increase inactivity (proportional to a content) of the silicon and/or manganese on the surface means that the content of these elements is increased, and also means that the activity of oxygen on the surface is reduced so as to implement difficulty in removing carbon present on the surface. As such, in a case in which the content of the silicon and manganese is increased and decarburization does not occur on the surface, sensitivity of the surface to cracks is increased and cracks are easily generated, and thus, LME is likely to increase.

On the other hand, in a case in which the relationship between the concentration profiles of oxygen and silicon and/or manganese is controlled as in the present disclosure, the concentration of silicon and/or manganese on the surface is decreased, and decarburization occurs actively, such that a soft layer may be formed on the surface. In a case in which a soft layer is formed, plastic deformation may occur even when tensile stress is applied during welding, and the stress may thus be absorbed. Accordingly, generation of cracks may be effectively suppressed.

Therefore, in the present disclosure, a difference between a depth at which a maximum point of the concentration profile of oxygen (O) appears (hereinafter, simply referred to as a "maximum point depth") and a depth at which a maximum point of the concentration profile of silicon (Si) and/or manganese (Mn) appears is controlled within 0.5 μm, such that softening of a surface layer is promoted and occurrence of LME is suppressed. In an exemplary embodiment in the present disclosure, the difference in depth may refer to an absolute value of the difference between the depths at which the maximum values of the two profiles are formed. According to an exemplary embodiment in the present disclosure, the difference in depths may be limited within 0.3 μm, and in another exemplary embodiment in the present disclosure, a value thereof may be limited within 0.2 μm or within 0.1 μm. Since the maximum points may be formed at the same position, a lower limit of the difference in value is not particularly set and may be 0 μm. In addition, one or more maximum points of the concentration profile for each element may be formed, but the maximum point in the present disclosure refers to a first maximum point close to the surface.

In an exemplary embodiment in the present disclosure, the maximum point depth of oxygen may be smaller than the maximum point depth of silicon and/or manganese. As such, in the case in which the maximum point depth of each element is controlled, diffusion of silicon and/or manganese to the surface may be more effectively suppressed.

According to an exemplary embodiment in the present disclosure, when the difference between the maximum point depth of oxygen and the maximum point depth of one or two elements of silicon and manganese satisfies the above range, advantageous effects of the present disclosure may be obtained. However, in order to more reliably obtain the effects of the present disclosure, the difference between the maximum point depth of oxygen and both the maximum point depths of silicon and manganese may correspond to the above range.

The concentration profiles of oxygen, and silicon and manganese are not necessarily limited because the concentration profiles may be measured by various methods known in the art. However, in an exemplary embodiment in the present disclosure, a profile measured from the surface to the inside of the base steel sheet using glow discharge optical emission spectrometry (GDOES) may be used.

In an exemplary embodiment in the present disclosure, when an oxygen concentration at the maximum point is 0.3 wt % or more, it is more advantageous to more reliably form a soft layer. This is because, as the maximum point of oxygen is higher, silicon and manganese present inside the steel sheet may be more securely fixed to prevent movement to the surface. In addition, according to an exemplary embodiment in the present disclosure, the oxygen concentration at the maximum point may be 0.4 wt % or more, and in some cases may be 0.5 wt % or more. There is no need to specifically set an upper limit of the oxygen concentration at the maximum point, but in general, the upper limit of the oxygen concentration at the maximum point may be set to 1.0 wt % or less, 0.8 wt % or less, or 0.7 wt % or less.

Therefore, in an exemplary embodiment in the present disclosure, the overall composition of the steel is set to have a composition of high alloy steel for high strength, and a soft layer is formed and a distribution of internal oxides is also controlled in the surface layer in which cracks are generated, such that resistance to LME and fatigue strength of the welds during welding may be improved.

In the present disclosure, the maximum point and the concentration at the maximum point of each element may be obtained as follows. First, as illustrated in FIG. 1, a GDOES profile is obtained. In this case, a GDOES profile obtained at a depth interval of 10 to 30 nm may be used, and in an exemplary embodiment in the present disclosure, a GDOES profile obtained at a depth interval of 20 nm is used. The first data obtained has a shape having an appropriate maximum point as illustrated in FIG. 1, but it may be a little difficult to determine an exact position thereof. In this case, in a case in which an oxygen concentration at each point is obtained using a five-point average value obtained by averaging data values at the point and each of two points before and after the point, a relatively smooth shape may be exhibited.

The maximum point and the corresponding oxygen concentration in the oxygen concentration profile obtained by such a process may be obtained. A minimum point refers to a point representing the lowest value in the smoothed oxygen concentration profile, and a maximum point refers to a point representing the highest value at a point after the minimum value. In an exemplary embodiment in the present disclosure, the maximum point of the oxygen concentration profile may appear at a depth of 4 μm or more from the surface of the steel sheet. In a case in which the maximum point appears at a depth too close to the surface, it may be difficult to form a soft layer on the surface. Therefore, it is advantageous to form the maximum point at a point located at a predetermined depth or more from the surface. On the contrary, even in a case in which the maximum point is too far from the surface, a depletion effect of silicon and manganese, and the like may not be sufficient. Therefore, according to an exemplary embodiment in the present disclosure, the maximum point may appear at a depth within 15 μm from the surface of the steel sheet. According to another exemplary embodiment in the present disclosure, the maximum point of the oxygen concentration profile may appear at a depth within 10 μm from the surface, and more preferably may appear at a depth within 10 μm from the surface.

In an exemplary embodiment in the present disclosure, the GDOES concentration profile of oxygen in the depth direction may be measured at the central portion in a width direction of the steel sheet. However, in general, since an edge portion in the width direction often has a higher value than that at the central portion in the width direction of the steel sheet, a profile measured at the edge portion may be used in order to more effectively improve spot weldability. In this case, the edge portion refers to both ends of the steel sheet, but in a case in which there is a problem with integrity of a specimen, such as occurrence of contamination at the point, the edge portion may refer to a point located 1 mm inside from the end in the width direction.

The type of steel sheet targeted in the present disclosure is not limited as long as it is a high-strength steel sheet having a strength of 490 MPa or more. However, the steel sheet targeted in the present disclosure may have, but is not necessarily limited to, a composition comprising, by weight ratio, 0.05 to 1.5% of C, 2.0% or less of Si, 1.0 to 30% of Mn, 3% or less of S—Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N. The remaining components are iron and other impurities, and further inclusion of other elements that are not listed above and may be contained in the steel in a range of 1.0% or less in total is not be excluded. In the present disclosure, the content of each element is represented based on weight unless otherwise indicated. The composition refers to a bulk composition of the steel sheet, that is, a composition at a point of ¼ of the thickness of the steel sheet (the same applies in the following).

In several exemplary embodiments in the present disclosure, TRIP steel and the like may be used as the high-strength steel sheet. These steels may have the following composition when being classified in detail.

Steel composition 1: Comprising 0.05 to 0.30% (preferably 0.10 to 0.25%) of C, 0.5 to 2.5% (preferably 1.0 to 1.8%) of Si, 1.5 to 4.0% (preferably 2.0 to 3.0%) of Mn, 1.0% or less (preferably 0.05% or less) of S—Al, 2.0% or less (preferably 1.0% or less) of Cr, 0.2% or less (preferably 0.1% or less) of Mo, 0.005% or less (preferably 0.004% or less) of B, 0.1% or less (preferably 0.05% or less) of Nb, 0.1% or less (preferably 0.001 to 0.05%) of Ti, 0.05% or less of Sb+Sn+Bi, 0.01% or less of N, and a balance of Fe and inevitable impurities. In some cases, elements that are not listed above but may be contained in the steel may be further contained in a range of 1.0% or less in total.

Steel composition 2: Comprising 0.05 to 0.30% (preferably 0.10 to 0.2%) of C, 0.5% or less (preferably 0.3% or less) of Si, 4.0 to 10.0% (preferably 5.0 to 9.0%) of Mn, 0.05% or less (preferably 0.001 to 0.04%) of S—Al, 2.0% or less (preferably 1.0% or less) of Cr, 0.5% or less (preferably 0.1 to 0.35%) of Mo, 0.005% or less (preferably 0.004% or less) of B, 0.1% or less (preferably 0.05% or less) of Nb, 0.15% or less (preferably 0.001 to 0.1%) of Ti, 0.05% or less of Sb+Sn+Bi, 0.01% or less of N, and a balance of Fe and inevitable impurities. In some cases, elements that are not listed above but may be contained in the steel may be further contained in a range of 1.0% or less in total.

In addition, among the above-described respective elements, an element of which a lower limit of a content is not limited may be regarded as an arbitrary element, and the content thereof may be 0%.

According to an exemplary embodiment in the present disclosure, one or more plating layers may be included in the surface of the steel sheet, and the plating layer may be a zinc-based plating layer including a galvanized (GI) layer, a galvannealed (GA) layer, or the like. In the present disclosure, since the difference between the maximum point depth of oxygen and the maximum point depth of silicon and/or manganese is appropriately controlled as described above, the problem of liquid metal embrittlement (LME) occurring during spot welding may be prevented even when the zinc-based plating layer is formed on the surface of the steel sheet.

According to an exemplary embodiment in the present disclosure, in a case in which the zinc-based plating layer is a GA layer, a degree of alloying (refers to a content of Fe in the plating layer) may be controlled to 8 to 13 wt %, and preferably 10 to 12 wt %. In a case in which the degree of alloying is not sufficient, the possibility of liquid metal embrittlement caused by zinc in the zinc-based plating layer permeating into microcracking may remain. On the contrary, in a case in which the degree of alloying is too high, problems such as powdering may occur.

In addition, a coating weight of the zinc-based plating layer may be 30 to 70 g/m². When the coating weight is too small, it may be difficult to obtain sufficient corrosion resistance, and on the contrary, when the coating weight is too large, problems such as an increase in manufacturing cost and liquid metal embrittlement may occur. Thus, the coating weight is controlled within the above range. A more preferable range of the coating weight may be 40 to 60 g/m². The coating weight refers to the amount of plating layer coated on a final product. In a case in which the plating layer is a GA layer, a weight thereof may be slightly decreased before alloying because the coating weight is increased due to alloying, and since the coating weight varies depending on the degree of alloying, the coating amount (the amount of plating from a plating bath) before alloying may be, but is not necessarily limited to, a value decreased by about 10%.

Hereinafter, an exemplary embodiment of manufacturing a steel sheet of the present disclosure will be described. However, the steel sheet of the present disclosure may not necessarily be manufactured according to the following exemplary embodiment. It should be noted that the following exemplary embodiment is one preferred method for manufacturing the steel sheet of the present disclosure.

First, a hot-rolled steel sheet may be manufactured by a process of providing a steel slab having the above-described composition, hot-rolling the steel slab, and then performing coiling. The conditions of the hot-rolling and the like are not particularly limited, but in an exemplary embodiment in the present disclosure, a heating temperature of the slab and a coiling temperature may be limited as follows.

Heating of Slab: 950 to 1,350° C.

In order to sufficiently solid-dissolve solid solution elements and reduce rolling resistance, it is required to heat a slab to a temperature of 950° C. or higher. In the case of the present disclosure, since a large amount of alloying elements may be contained, the heating temperature of the slab may be 1,000° C. or higher, preferably 1,100° C. or higher, and more preferably 1,150° C. or higher. However, when the heating temperature of the slab is too high, problems such as oxidation of solid solution elements may occur, a size of an austenite grain may become coarse, and it is not advantageous in terms of energy. Therefore, an upper limit of the heating temperature may be 1,350° C., preferably 1,300° C., and more preferably 1,280° C. or lower.

Coiling Temperature: 590 to 750° C.

The heat-rolled steel sheet is then coiled and stored in a coil form, and the coiled steel sheet is subjected to a slow cooling process. Oxidative elements contained in the surface layer of the steel sheet are removed by such a process. When the coiling temperature of the hot-rolled steel sheet is too low, the coil is slowly cooled at a temperature lower than a temperature required for oxidation removal of these elements, and thus, it is difficult to obtain sufficient effects.

Pickling Treatment: Performed at Sheet-Passing Speed of 180 to 250 mpm

In order to remove hot-rolled scale, the hot-rolled steel sheet subjected to the above-described process is put into a hydrochloric acid bath to perform a pickling treatment. The pickling is performed at a concentration of the hydrochloric acid in the hydrochloric acid bath of 10 to 30 vol % and a pickling sheet-passing speed of 180 to 250 mpm. When the pickling speed exceeds 250 mpm, the surface scale of the hot-rolled steel sheet may not be completely removed, and when the pickling speed is lower than 180 mpm, a surface layer of base iron may be corroded by hydrochloric acid. Therefore, the pickling is performed at 180 mpm or higher.

Cold-Rolling: Reduction Rate of 35 to 60%

After performing the pickling, a cold-rolling is performed. The cold-rolling is performed at a cold reduction rate of 35 to 60%. When the cold reduction rate is less than 35%, there is no particular problem, but it may be difficult to sufficiently control a microstructure due to an insufficient recrystallization driving force during annealing. When the cold reduction rate exceeds 60%, a thickness of an internal oxide layer secured during hot-rolling is decreased, and thus, it is difficult to have a sufficient internal oxidation depth and a maximum value of the oxygen concentration after annealing.

After the cold-rolling process, a process of performing recrystallization annealing on the steel sheet may be followed. Since the GDOES concentration profiles of oxygen, and silicon and manganese in the surface layer may vary greatly during an annealing process of the steel sheet, in an exemplary embodiment in the present disclosure, the annealing process may be controlled under conditions for appropriately controlling the GDOES concentration profile of each element in the surface layer in the depth direction, and in particular, a sheet-passing speed and a dew point in an annealing furnace may be controlled under the following conditions.

Sheet-Passing Speed: 40 to 130 Mpm

In order to secure sufficient productivity, a sheet-passing speed of the cold-rolled steel sheet needs to be 40 mpm or higher. However, when the sheet-passing speed is excessively fast, it may be disadvantageous in terms of securing a material. Therefore, in an exemplary embodiment in the present disclosure, an upper limit of the sheet-passing speed may be set to 130 mpm.

Control of Dew Point in Annealing Furnace: Control in Range of 650 to 900° C. to −10 to 30° C.

It is advantageous to control the dew point in the annealing furnace in order to obtain a value of a decarburization rate in the surface layer in an appropriate range. When the dew point is too low, surface oxidation rather than internal oxidation occurs, which may cause generation of oxides such as Si and Mn on the surface. These oxides adversely affect plating. Therefore, the dew point needs to be controlled to −10° C. or higher. On the contrary, the dew point is too high, oxidation of Fe may occur, and thus, the dew point needs to be controlled to 30° C. or lower. As such, a temperature for controlling the dew point may be 650° C. or higher, which is a temperature at which a sufficient internal oxidation effect is exhibited. In an exemplary embodiment in the present disclosure, the temperature and the dew point in the annealing furnace may be determined based on a temperature and a dew point in a soaking zone. However, when the temperature is too high, diffusion of oxygen to the inside is inhibited due to generation of oxides such as Si on the surface, and a carbon diffusion rate is reduced due to excessive generation of austenite during heating of the soaking zone. Therefore, a level of internal oxidation may be reduced, and the size of the austenite in the soaking zone is excessively increased, resulting in softening of the material. In addition, a load on the annealing furnace is generated, which may cause problems such as shortening of equipment lifespan and an increase in process cost. Therefore, a temperature for controlling the dew point may be 900° C. or lower.

In this case, the dew point may be adjusted by injecting wet nitrogen ($N_2+H_2O$) containing water vapor into the annealing furnace. According to an exemplary embodiment in the present disclosure, the nitrogen gas may contain 5 to 10% of hydrogen ($H_2$), such that the dew point may be controlled within an appropriate range.

The steel sheet annealed by such a process may be directly dipped in a plating bath, and hot-dip galvanizing may be performed. Then, the plated hot-dip galvanized steel sheet may be subjected to an alloying heat treatment, if necessary. Preferred conditions of the plating and the alloying heat treatment are as follows.

Entering Temperature of Steel Sheet into Plating Bath: 420 to 500° C.

When the entering temperature of the steel sheet into the plating bath is too low, wettability in a contact interface between the steel sheet and liquid zinc is not sufficiently secured, and thus, it needs to be maintained at 420° C. or higher. When the entering temperature of the steel sheet into the plating bath is too high, adhesion of the plating layer is reduced due to generation of a zeta phase, which is an Fe—Zn alloy phase, at the interface caused by an excessive reaction between the steel sheet and the liquid zinc, and an elution amount of an Fe element in the steel sheet is excessive in the plating bath, which causes generation of dross in the plating bath.

Al Concentration in Plating Bath: 0.10 to 0.25%

An Al concentration in the plating bath needs to be appropriately maintained in order to secure wettability of the plating layer and fluidity in the plating bath. In the present disclosure, the Al concentration in the plating bath is controlled in a range of 0.10 to 0.25% to this end. In addition, the steel sheet may be divided into a hot-dip galvannealed (GA) steel sheet and a hot-dip galvanized (GI) steel sheet according to whether or not an alloying treatment is performed. In an exemplary embodiment in the present disclosure, in order to maintain the formation of dross in the plating bath to an appropriate level and to secure plating surface quality and performance, in the case of the GA steel sheet, the Al concentration may be controlled to 0.10 to 0.15%, and in the case of the GI steel sheet, the Al concentration may be controlled to 0.2 to 0.25%.

Galvannealed (GA) Temperature: 480 to 560° C.

When a galvannealed temperature is lower than 480° C., the degree of alloying is not sufficient due to a small amount of Fe diffused, which may cause deterioration of physical properties of plating, and when the galvannealed temperature exceeds 560° C., powdering may occur due to excessive alloying, and the material may be deteriorated due to transformation of retained austenite into ferrite. Thus, the galvannealed temperature is set in the above range.

As described above, the galvanized steel sheet of the present disclosure may be obtained. However, in an exemplary embodiment in the present disclosure, in order to further improve weldability of the edge portion, a process of heating the edge portion may be further included.

Heating of Edge Portion of Hot-Rolled Coil: Performed at 600 to 800° C. for 5 to 24 Hours In an exemplary embodiment in the present disclosure, the edge portion of the hot-rolled coil may be heated to further increase a difference between a minimum value and a maximum value in a GDOES depth profile of oxygen at the edge portion. The heating of the edge portion of the hot-rolled coil refers to heating both ends of the coiled coil in the width direction, that is, the edge portions, and the edge portion may be preferentially heated to a temperature suitable for oxidation by heating the edge portion. That is, in the coiled coil, while an internal portion is maintained at a high temperature, the edge portion is cooled relatively quickly, such that the time when the temperature is maintained at a temperature suitable for internal oxidation may be further shortened at the edge portion. Therefore, the removal of the oxidative elements at the edge portion may not be active as compared to the central portion in the width direction. The heating of the edge portion may be used as one method for removing the oxidative elements at the edge portion.

That is, in a case in which the edge portion is heated, the edge portion is preferentially heated, conversely from the case of performing cooling after coiling, and accordingly, the temperature of the edge portion in the width direction is maintained to be suitable for internal oxidation. As a result, a thickness of an internal oxide layer of the edge portion is increased. To this end, the heating temperature of the edge portion needs to be 600° C. or higher (based on the temperature of the edge portion of the steel sheet). However, when the temperature is too high, scale may be excessively formed at the edge portion during heating or porous high-oxidized scale (hematite) may be formed, such that surface state after picking may be deteriorated. Therefore, the temperature of the edge portion may be 800° C. or lower. A more preferred heating temperature of the edge portion is 600 to 750° C.

In addition, in order to solve non-uniformity of the difference between the minimum value and maximum value in the GDOES depth profile of oxygen in the surface layer between the edge portion and the central portion in the width direction during the coiling, the heating time needs to be 5 hours or longer. However, when the heating time of the edge portion is too long, scale may be excessively formed, or on the contrary, the difference between the minimum value and maximum value in the GDOES depth profile of oxygen in the surface layer at the edge portion may be increased too much. Therefore, the heating time of the edge portion may be 24 hours or shorter.

According to an exemplary embodiment in the present disclosure, the heating of the edge portion may be performed by a combustion heating method by adjusting an air-fuel ratio. That is, an oxygen fraction in the atmosphere may be changed by adjusting the air-fuel ratio. As an oxygen partial pressure is higher, a concentration of oxygen in contact with the surface layer of the steel sheet is more increased, such that decarburization or internal oxidation may be increased. In an exemplary embodiment in the present disclosure, the atmosphere may be controlled to a nitrogen atmosphere containing 1 to 2% of oxygen by adjusting the air-fuel ratio, although not necessarily limited thereto. Those skilled in the art to which the present disclosure pertains may control the oxygen fraction by adjusting the air-fuel ratio without any particular difficulty, and thus, the description thereof will not be provided.

MODE FOR INVENTION

Hereinafter, the present disclosure will be described in more detail with reference to Examples. However, it should be noted that the following Examples are only intended to further illustrate the present disclosure and are not intended to limit the scope of the present disclosure. This is because the scope of the present disclosure is determined by matters described in the claims and matters reasonably inferred therefrom.

EXAMPLES

A steel slab having the composition shown in Table 1 (The remaining components not listed in the table are Fe and inevitable impurities. In addition, in the table, B and N are represented in ppm unit, the remaining components are represented in wt % unit, and the content of each of the components not listed in the table means 0 wt %. The steel slab was heated to 1,230° C., the heated steel slab was hot-rolled, and then, an edge portion of the hot-rolled coil was heated. Thereafter, a steel sheet proceeding at a sheet-passing speed of 210 mpm in a pickling line having a length of 100 mm was pickled with a 19.2 vol % hydrochloric acid solution, and then, the pickled steel sheet was cold-rolled.

Immediately after annealing the obtained cold-rolled steel sheet in an annealing furnace, hot-dip galvanizing was performed by immersing GA in a plating bath containing 0.13% of Al and GI in a zinc-based plating bath containing 0.24 wt % of Al at 456° C. The obtained hot-dip galvanized steel sheet was subjected to a galvannealed (GA) heat treatment, if necessary, to finally obtain a hot-dip galvannealed (GA) steel sheet.

In all Examples, an entering temperature of the steel sheet entering into the hot-dip galvanizing bath was set to 475° C. Other conditions for each Example are as shown in Table 2.

TABLE 1

| Steel type | C | Si | In | S—Al | Cr | Mo | B | N | Nb | Ti | Sb | Sn | Si |
|---|---|---|---|---|---|---|---|---|---|---|---|---|---|
| A | 0.215 | 0.154 | 2.451 | 0.0024 | 0.22 | 0 | 17 | 0.001 | 0.014 | 0.014 | 0 | 0.0145 | 0 |
| B | 0.2125 | 3.15 | 2.2255 | 0.0215 | 0 | 0.024 | 14 | 0.0015 | 0.011 | 0.021 | 0.012 | 0 | 0 |
| C | 0.184 | 0 | 7.151 | 0.0011 | 0.024 | 0.014 | 12 | 0.0012 | 0.012 | 0.045 | 0 | 0 | 0.011 |
| D | 0.27 | 0 | 1.3 | 0.0014 | 0.012 | 0.054 | 19 | 0.0014 | 0.045 | 0.017 | 0 | 0 | 0 |
| E | 0.178 | 1.452 | 2.354 | 0.0027 | 0.457 | 0.0475 | 11 | 0.0012 | 0.05 | 0.032 | 0 | 0 | 0.012 |
| F | 0.21 | 1.75 | 2.645 | 0.0034 | 0.012 | 0 | 14 | 0.005 | 0.0154 | 0.044 | 0 | 0 | 0 |
| G | 0.187 | 1.524 | 2.543 | 0.0017 | 0 | 0 | 18 | 0.004 | 0.014 | 0.054 | 0 | 0 | 0 |

TABLE 2

| Steel type | Classification | Hot-roll coiling temperature (° C.) | Cold-roll reduction rate (%) | Annealing sheet-passing speed (mpm) | Soaking zone temperature (° C.) | Hydrogen concentration in annealing furnace (vol %) | Dew point of soaking zone (° C.) | GA temperature (° C.) |
|---|---|---|---|---|---|---|---|---|
| C | Comparative Example 1 | 504 | 57 | 117 | 784 | 14 | 20 | 520 |
| F | Comparative Example 2 | 617 | 41 | 37 | 765 | 7 | 0 | 480 |
| E | Inventive Example 1 | 651 | 44 | 67 | 824 | 7 | 15 | 510 |
| D | Comparative Example 3 | 617 | 52 | 105 | 827 | 1 | 16 | 508 |
| F | Inventive Example 2 | 632 | 45 | 62 | 784 | 6 | 22 | — |
| C | Comparative Example 4 | 624 | 51 | 84 | 817 | 0.2 | 10 | 514 |
| C | Inventive Example 3 | 621 | 45 | 72 | 842 | 7 | 17 | — |
| C | Inventive Example 4 | 651 | 52 | 76 | 851 | 7 | 12 | 492 |
| G | Comparative Example 5 | 624 | 40 | 105 | 917 | 4 | −5 | 521 |
| A | Comparative Example 6 | 776 | 51 | 127 | 795 | 12 | 14 | 502 |
| A | Inventive Example 5 | 647 | 51 | 81 | 824 | 5 | 14 | — |
| A | Inventive Example 6 | 685 | 48 | 84 | 865 | 6 | 5 | — |
| E | Comparative Example 7 | 617 | 75 | 123 | 762 | 20 | 14 | 501 |
| G | Inventive Example 7 | 695 | 45 | 72 | 841 | 6 | 5 | 506 |
| G | Comparative Example 8 | 627 | 50 | 83 | 813 | 1 | 35 | 513 |
| B | Comparative Example 9 | 621 | 49 | 91 | 847 | 0 | 15 | 521 |
| C | Inventive Example 8 | 612 | 46 | 54 | 754 | 7 | 14 | 501 |
| D | Comparative Example 10 | 634 | 41 | 142 | 748 | 5 | 5 | 492 |
| A | Inventive Example 9 | 601 | 52 | 82 | 824 | 8 | 12 | 521 |
| A | Comparative Example 11 | 634 | 52 | 74 | 621 | 14 | 0 | — |
| E | Inventive Example 10 | 615 | 47 | 75 | 795 | 8 | 21 | — |
| A | Comparative Example 12 | 634 | 49 | 81 | 805 | 21 | −21 | — |

The properties of the hot-dip galvanized steel sheets manufactured by the above-described process were measured. The results of observing whether or not liquid metal embrittlement (LME) occurs during spot welding are shown in Table 3. The spot welding was performed along each cut edge obtained by cutting the steel sheet in a width direction. A spot welding current was applied twice and a hold time of 1 cycle was maintained after applying the current. The spot welding was performed in two types and three layers. The spot welding was performed by laminating in the order of evaluation material-evaluation material-GA 980DP 1.4 t (having a composition of 0.12 wt % of C, 0.1 wt % of Si, and 2.2 wt % of Mn). In the spot welding, a new electrode was welded to a soft material 15 times, the electrode was abraded, and then, an upper limit current at which expulsion occurred was measured with a spot welding target material. After measuring the upper limit current, spot welding was performed 8 times for each welding current at a current lower than the upper limit current by 0.5 and 1.0 kA, a cross-sectional surface of the spot weld was precisely processed by electric discharge processing and was epoxy-mounted and ground, and a length of a crack was measured with an optical microscope. In the observation with the optical microscope, the magnification was set to be 100 times, and when no crack was observed at the magnification, it was determined that liquid metal embrittlement did not occur, and when a crack was observed, a length thereof was measured using image analysis software. It was determined as "good" when a length of a B-type crack generated at a shoulder portion of the spot weld was 100 μm or less, and was determined as "good" when no C-type crack was observed.

Maximum point depths and concentrations at the maximum point depths of oxygen, and silicon and manganese in the GDOES concentration profiles in the surface layer were calculated using concentration values for each depth obtained by a five-point average of data obtained from the GDOES profile. That is, the GDOES concentration profiles of oxygen, and silicon and manganese in the surface layer were obtained, a depth at which a maximum point for each element appeared in the profile was obtained, and then, the smallest value of the difference between the maximum point depths of oxygen, and silicon and manganese was defined as a depth difference.

A tensile strength was measured by a tensile test by preparing a sample of the JIS-5 standard taken in a C direction. A degree of alloying and a coating weight were measured using a wet dissolution method using a hydrochloric acid solution.

The GA steel sheet was subjected to a powdering test and a flaking test. As for the powdering, a plating material was bent to 90 degrees, tape was adhered to the bent area and peeled off, and how many mm of a matter peeled off from a plating layer was on the tape was observed. It was determined as "defective" when the length of the plating layer peeled off from the tape exceeded 10 mm. In the flaking test, the sample was processed into a "U" shape, and whether or not the plating layer was peeled off from the processed portion was observed.

The GI steel sheet was subjected to a sealer bending test (SBT) to check whether the plating layer was peeled off and attached to a surface from which a sealer was removed when an adhesive for a structure for a vehicle was attached to the surface of the steel sheet and the steel sheet was bent to 90 degrees. The surface quality was observed by visually observing whether or not defects such as non-plating occurred in the steel sheet, and it was determined as "defective" when defects such as non-plating was visually observed.

TABLE 3

| Classification | 1) | Tensile strength (MPa) | Plating type | Coating weight (g/m²) | Surface quality | 2) | Flaking | SBT | 3) | 4) |
|---|---|---|---|---|---|---|---|---|---|---|
| Comparative Example 1 | 0.54 | 1193 | GA | 42 | Good | 3 | — | Good | 152 | 754 |
| Comparative Example 2 | 0.73 | 542 | GA | 42 | Good | 4 | Good | — | 21 | ND |
| Inventive Example 1 | 0.21 | 1258 | GA | 44 | Good | 4 | Good | — | 24 | ND |
| Comparative Example 3 | 0.71 | 1207 | GI | 61 | Defective | — | — | Peeled off | 21 | 654 |
| Inventive Example 2 | 0.04 | 1245 | GA | 48 | Good | 2 | Good | — | 31 | ND |
| Comparative Example 4 | 0.23 | 1145 | GI | 62 | Defective | — | — | Peeled off | 15 | ND |
| Inventive Example 3 | 0.05 | 1021 | GA | 48 | Good | 3 | Good | — | 24 | ND |
| Inventive Example 4 | 0.42 | 1204 | GA | 42 | Good | 7 | Good | — | 62 | ND |
| Comparative Example 5 | 0.56 | 745 | GA | 45 | Good | 6 | Good | — | 43 | 511 |
| Comparative Example 6 | 0.41 | 745 | GA | 47 | Defective | 3 | Peeled off | — | 24 | ND |
| Inventive Example 5 | 0.24 | 1195 | GA | 45 | Good | 2 | Good | — | 84 | ND |
| Inventive Example 6 | 0.23 | 1192 | GI | 62 | Good | — | — | Good | 15 | ND |
| Comparative Example 7 | 0.62 | 1193 | GA | 41 | Good | 4 | Good | — | 41 | 452 |
| Inventive Example 7 | 0.49 | 1184 | GA | 47 | Good | — | — | — | 45 | ND |
| Comparative Example 8 | 0.01 | 771 | GI | 59 | Good | — | — | Peeled off | 17 | ND |
| Comparative Example 9 | 0.64 | 1192 | GI | 62 | Defective | — | — | Peeled off | 45 | 214 |

TABLE 3-continued

| Classification | 1) | Tensile strength (MPa) | Plating type | Coating weight (g/m$^2$) | Surface quality | 2) | Flaking | SBT | 3) | 4) |
|---|---|---|---|---|---|---|---|---|---|---|
| Inventive Example 8 | 0.14 | 1192 | GI | 56 | Good | — | — | Good | 0 | ND |
| Comparative Example 10 | 0.74 | 1201 | GA | 49 | Good | 5 | Good | — | 57 | 651 |
| Inventive Example 9 | 0.21 | 1218 | GA | 47 | Good | 4 | Good | — | 45 | ND |
| Comparative Example 11 | 0.63 | 641 | GA | 44 | Good | 8 | Good | — | 15 | 124 |
| Inventive Example 10 | 0.01 | 1189 | GA | 45 | Good | 6 | — | — | 17 | ND |
| Comparative Example 12 | 0.65 | 1194 | GI | 61 | Defective | — | — | Peeled off | 32 | ND |

In Table 3, 1) represents the smallest value among the differences between the maximum point depth in the concentration profile of oxygen and the maximum point depth in the profile of silicon and/or manganese, 2) represents the powdering length (mm), 3) represents the length (μm) of the B-type LME cracks generated during electrical resistance spot welding, and 4) represents the length (μm) of the C-type LME cracks generated during electrical resistance spot welding. In the table, ND means "not detected".

In Inventive Examples 1, 2, 3, 4, 5, 6, 7, 8, 9, and 10, the steel composition satisfied the range suggested by the present disclosure, and the manufacturing method also satisfied the range of the present disclosure, such that the tensile strength, the plating quality, the coating weight, and the spot welding LME crack length were also good.

In Comparative Examples 3 and 9, the hydrogen concentration in the annealing furnace was low. As a result, in Comparative Examples 3 and 9, the amount of surface oxidation in the surface layer was excessive, and thus, the difference between the maximum value depths of oxygen and Si or Mn in the surface layer according to GDOES was not large. Therefore, LME cracks did not satisfy the standard because a sufficient decarburization layer was not formed and an alloying inhibiting layer was not sufficiently formed at the interface between the plating layer and the base iron, the surface quality was deteriorated due to occurrence of non-plating on the surface, and the plating adhesion was deteriorated due to occurrence of peeling in SBT.

In Comparative Examples 1 and 6, the coiling temperature in the hot-rolling process did not satisfy the range suggested by the present disclosure. In Comparative Example 1, the amount of internal oxidation generated by hot-rolling was not sufficient because the hot-roll coiling temperature was lower than the range suggested by the present disclosure, the difference between the maximum point depth of the oxygen concentration and the maximum point depth of the Si or Mn concentration in the surface layer according to GDOES exceeded 0.5 μm, and as a result, the LME cracks did not satisfy the standard. In Comparative Example 6, since the steel sheet was manufactured at a temperature higher than the hot-roll coiling temperature suggested by the present disclosure, the amount of internal oxidation generated during the hot-rolling process was sufficient, and thus, LME characteristics were good, but the scale was not completely removed during pickling due to generation of excessive hot-rolled scale, plating peeling occurred in the flaking evaluation due to defective surface quality caused by occurrence of non-plating, and the hot-rolled material was softened due to an excessively high hot-roll coiling temperature and the material was deteriorated because the softening was not recovered even after annealing.

In Comparative Example 12, the dew point in the furnace during the annealing was controlled to be lower than the range suggested by the present disclosure. Even when an internal oxide layer was sufficiently formed over the entire width in the hot-roll heating process, the internal oxidation was not sufficient because the dew point was not sufficiently high in the annealing process after the cold-rolling, and thus, the smallest value among the differences between the maximum point depth of oxygen and the maximum point depth of Si or Mn in the surface layer according to GDOES was 0.5 μm or more, and the length of the spot welding LME crack was defective due to an insufficient degree of surface decarburization.

In Comparative Example 8, the dew point in the annealing furnace exceeded the range suggested by the present disclosure. The internal oxidation was sufficiently generated due to an excessively high dew point, and thus, the length of the LME crack was good, but the tensile strength standard was not satisfied due to deterioration of the material caused by the excessive internal oxidation, and the amount of surface oxides generated due to the excessive dew point was increased, resulting in occurrence of plating peeling as a result of SBT.

In Comparative Example 10, the sheet-passing speed of the steel sheet in the annealing furnace was higher than the range suggested by the present disclosure. Since the time for the decarburization reaction in which the water vapor and the steel sheet were reacted in the annealing furnace was not sufficient, internal oxidation in the surface layer after annealing was not sufficiently formed, and thus, the difference between the maximum point depth of the oxygen concentration and the maximum point depth of the Si or Mn concentration according to GDOES was 0.5 μm or more, and when the spot welding LME crack was evaluated, the result exceeded the standard, which was defective.

In Comparative Example 2, the sheet-passing speed of the steel sheet in the annealing was lower than the range suggested by the present disclosure. Since the time for the decarburization reaction in which the water vapor and the steel sheet were reacted in the annealing furnace was excessive, the internal oxides of Si were formed deep in the base iron. The difference between the maximum point depth of the oxygen concentration and the maximum point depth of the Si or Mn concentration in the surface layer according to GDOES was 0.5 μm or more, and when the spot welding LME crack was evaluated, the standard was satisfied, but the material was not satisfied due to excessive decarburization.

In Comparative Example 5, the temperature of the soaking zone in the annealing furnace exceeded the range suggested by the present disclosure. The internal oxidation was not sufficient due to an increase in an amount of external oxides caused by the excessively high annealing temperature, and thus, the difference between the maximum point depth of the oxygen concentration and the maximum point depth of the Si or Mn concentration in the surface layer according to GDOES exceeded 0.5 µm. As a result, the LME cracks did not satisfy the standard, and spot weldability was defective. In addition, austenite was excessively formed and grown in the soaking zone, such that material did not satisfy the standard such as tensile strength.

In Comparative Example 11, the temperature of the soaking zone in the annealing furnace was controlled to be lower than the range suggested by the present disclosure. The internal oxidation was not sufficient due to an insufficient oxidation reaction between the water vapor and the steel sheet caused by a low annealing temperature. As a result, the difference between the maximum value depths of oxygen and Si or Mn in the surface layer according to GDOES exceeded 0.5 µm. Therefore, the LME cracks did not satisfy the standard, and thus, spot weldability was defective. In addition, a desired microstructure was not formed due to insufficient recrystallization during annealing, and thus, the material did not satisfy the standard such as tensile strength, and as a result of the SBT evaluation, the peeling occurred.

In Comparative Example 7, the reduction rate during the cold-rolling exceeded the range suggested by the present disclosure. The internal oxide layer formed during hot-rolling became thin in a position closer to the surface due to excessive cold-rolling, and the maximum point was formed in a deep position, such that the difference in maximum point was 0.5 µm or more, and the LME cracks did not satisfy the standard, which was defective.

In Comparative Example 4, the hydrogen concentration in the annealing furnace was less than 5 vol %, and the composition in the reducing atmosphere in the annealing furnace was insufficient. The difference in maximum point depth of each element satisfied the standard of the present disclosure because the internal oxidation and the decarburization were sufficiently formed due to an increase in dew point, and thus, the length of the LME crack was satisfied, but non-plating occurred due to excessive generation of oxides on the surface, resulting in deterioration of the surface quality and occurrence of peeling plating in SBT.

Therefore, the advantageous effects of the present disclosure could be confirmed.

The invention claimed is:

1. A zinc plated steel sheet comprising:
    a base steel sheet; and
    a zinc-based plating layer formed on a surface of the base steel sheet,
    wherein a concentration profile of oxygen, and a concentration profile of one or two of silicon and manganese measured in a depth direction from the surface of the base steel sheet have a maximum point in the depth direction from the surface, and
    an absolute value of a difference between a depth at which the maximum point of the concentration profile of oxygen is formed and a depth at which the maximum point of the concentration profile of the one or two of silicon and manganese is formed is 0.5 µm or less.

2. The zinc plated steel sheet of claim 1, wherein the depth at which the maximum point of the concentration profile of oxygen is formed is 4 to 15 µm.

3. The zinc plated steel sheet of claim 2, wherein an oxygen concentration at the maximum point is 0.3 wt % or more.

4. The zinc plated steel sheet of claim 1, wherein the depth at which the maximum point of the concentration profile of oxygen is formed is smaller than the depth at which the maximum point of the concentration profile of the one or two of silicon and manganese is formed.

5. The zinc plated steel sheet of claim 1, wherein the concentration profile is measured by glow discharge optical emission spectrometry (GDOES).

6. The zinc plated steel sheet of claim 1, wherein a coating weight of the zinc-based plating layer is 30 to 70 g/m$^2$.

7. The zinc plated steel sheet of claim 1, wherein the steel sheet has a composition comprising 0.05 to 1.5% of C, 2.0% or less of Si, 1.0 to 30% of Mn, 3% or less of S—Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N.

* * * * *